United States Patent [19]

Reed

[11] Patent Number: 4,852,968
[45] Date of Patent: Aug. 1, 1989

[54] OPTICAL FIBER COMPRISING A REFRACTIVE INDEX TRENCH

[75] Inventor: William A. Reed, Summit, N.J.

[73] Assignee: American Telephone and Telegraph Company, AT&T Bell Laboratories, Murray Hill, N.J.

[21] Appl. No.: 33,327

[22] Filed: Apr. 2, 1987

Related U.S. Application Data

[63] Continuation-in-part of Ser. No. 894,871, Aug. 8, 1986, abandoned.

[51] Int. Cl.$^4$ .............................................. G02B 6/22
[52] U.S. Cl. ............................. 350/96.33; 250/227
[58] Field of Search ............. 350/96.29, 96.30, 96.33; 455/610, 611, 612; 250/227, 237 R

[56] References Cited

U.S. PATENT DOCUMENTS

| | | | |
|---|---|---|---|
| 3,997,241 | 12/1976 | Nishida et al. | 350/96.33 |
| 4,217,027 | 8/1980 | MacChesney et al. | 350/96.3 |
| 4,257,797 | 3/1981 | Andrejco et al. | 65/3.11 |
| 4,262,035 | 4/1981 | Jaeger et al. | 427/39 |
| 4,302,230 | 11/1981 | MacChesney et al. | 65/3.12 |
| 4,331,462 | 5/1982 | Fleming et al. | 65/3.12 |
| 4,435,040 | 3/1984 | Cohen et al. | 350/96.33 |
| 4,447,127 | 5/1984 | Cohen et al. | 350/96.33 |
| 4,610,506 | 9/1986 | Tokunaga et al. | 350/96.33 |
| 4,641,917 | 2/1987 | Glodis et al. | 350/96.33 |
| 4,691,990 | 9/1987 | Cohen et al. | 350/96.33 |
| 4,715,679 | 12/1987 | Bhagavatula | 350/96.33 |

FOREIGN PATENT DOCUMENTS

| | | | |
|---|---|---|---|
| 83843 | 7/1983 | European Pat. Off. | 350/96.3 |
| 127408 | 12/1984 | European Pat. Off. | 350/96.33 |

OTHER PUBLICATIONS

*The Bell System Technical Journal*, vol. 62, No. 9, 11/83, pp. 2663–2694, T. A. Lenahan, "Calculation of Modes in an Optical Fiber Using the Finite Element Method and EISPACK".

*Primary Examiner*—Frank Gonzalez
*Attorney, Agent, or Firm*—Eugen E. Pacher

[57] ABSTRACT

A single mode optical fiber is disclosed. The refractive index profile of the fiber comprises a depressed-index or trench region in the cladding region. By suitable adjustment of the position, width and index of the trench region, one or more fiber characteristics can be improved, relative to a similar fiber that does not comprise an index trench.

25 Claims, 11 Drawing Sheets

OPTICAL FIBER COMPRISING A REFRACTIVE INDEX TRENCH

CROSS REFERENCE TO RELATED APPLICATION

This application is a continuation-in-part of Ser. No. 894,871, filed Aug. 8, 1986 (now abandoned).

TECHNICAL FIELD

The invention pertains to single mode optical fiber.

BACKGROUND OF THE INVENTION

Optical fibers have become of immense commercial importance in recent years because of their use in optical communication systems. Such communication systems have a number of advantages over conventional communication systems including extremely large bandwidths and high information transmission rates, easy availability of raw material for fiber fabrication, easy adaptability to pulse code modulation transmission, etc. Precise manufacturing standards and structure control are required for the fabrication of optical fibers to ensure transmission of optical signals through such fibers with a minimum of loss and dispersion. Improvements are still being made so as to increase bandwidth, required repeater-station spacing, ease of manufacturing, etc. Indeed, precise design and control of optical fiber properties for various applications are an ongoing activity for those involved in optical fiber manufacture.

At present, there are two types of optical fibers contemplated for use in optical communication systems. One type of fiber, the so-called single-mode fiber, has a relatively small core region and a relatively large cladding region of lower index of refraction. This results in a fiber with characteristics such that only one electromagnetic mode is transmitted with low loss. The advantage of single-mode fibers is their large bandwidth, relatively low dispersion, and relatively large spacing requirements between repeater stations. The other type is the so-called multimode fiber.

In both types of fibers, optimum performance in terms of low loss, low dispersion, high bandwidth, etc., depends critically on the index of refraction profile. This optimum index profile may be different for different wavelengths, types of optical fibers, etc., and may be different for fibers designed for different applications (e.g., maximum bandwidth, maximum distance between repeater stations, etc.).

A variety of methods have been used to make optical fibers. These methods have been reviewed in a number of references including, U.S. Pat. No. 4,257,797 issued to M. J. Andrejco and J. B. MacChesney on Mar. 24, 1981, and U. S. Pat. No. 4,302,230 issued to J. B. MacChesney et al on Nov. 24, 1981.

One particularly advantageous method of fabricating optical fibers is usually referred to as the modified chemical vapor deposition process (MCVD). This process is described in U. S. Pat. No. 4,217,027 issued to J. B. MacChesney and P. B. O'Connor on Aug. 12, 1980, and in U. S. Pat. No. 4,262,035 issued to R. E. Jaeger et al on Apr. 14, 1981. See also U. S. Pat. No. 4,331,462, issued to Fleming et al, May 25, 1982.

This application is only concerned with single mode fiber. As is well known, such fiber generally comprises a central region of relatively high refractive index (the core) that is contactingly surrounded by one or more concentric regions of relatively low refractive index (the cladding). In essentially all communication grade fibers in use today, the core and at least the inner cladding portion consist of low optical loss silica-based material. Such cladding material (herein to be referred to as the "low loss" cladding material) can be produced by any appropriate process, and is currently frequently formed in situ by means of an appropriate reaction and deposited on an appropriate substrate. Currently used fiber typically also comprises an outer cladding portion that consists of relatively high optical loss material (e.g., having a loss in the order of 100 db/km). This "high loss" cladding material can, for instance, be derived from a pre-existing silica-based tube, or from silica-based overclad. Fibers typically are designed such that the "high loss" cladding material plays substantially no part in the guiding of the optical radiation. The radius defining the boundary between the "low loss" and the "high loss" cladding material is herein designated as $a_d$.

Improvements in the design of single-mode optical fibers are highly desirable both as to improving transmission characteristics (loss, bandwidth, dispersion, etc.), improving the ease of fabricating the optical fiber and reducing the critical nature of the parameters of the optical fiber. In particular, low-loss fiber designs in which the dispersion minimum (or zero) occurs at the wavelength where losses are minimum are highly desirable. Also, for wavelength multiplexing applications, fiber designs which minimize dispersion over a given wavelength range are highly desirable. In addition, it is desirable to adjust the fiber parameters to minimize losses, ensure good mode confinement and to reduce the susceptibility of the fiber to bending loss. Low loss, single-mode fiber structures have been described in a number of references including U.S. Pat. No. 4,435,040 issued to L. G. Cohen et al on Mar. 6, 1984 and U.S. Pat. No. 4,447,127 issued to L. G. Cohen et al on May 8, 1984.

A variety of fiber structures have been described in the literature. Many of these structures have been discussed in a book by L. B. Jeunhomme entitled Single-Mode Fiber Optics, Principles and Applications, Marcel Dekker, Inc., New York, 1983. A particularly interesting single-mode fiber with multipleclad structure is described in U.S. Pat. No. 3,997,241 issued to S. Nishida et al on Dec. 14, 1976. Also of interest is a fiber structure, disclosed by V. A. Bhagavatula in a European patent application published on July 20, 1983 (Application Number 82306476.1), with a core and cladding in which the core includes a depressed refractive index region. See also the European Patent Application Number 84303402.6, published on Dec. 5, 1984.

It is frequently desirable in a single-mode optical fiber used for lightwave communications systems to have a reasonably wide wavelength range with zero or near zero dispersion at a wavelength of low-loss operation (exemplarily including 1.55 $\mu$m). It is frequently also desirable with such a design that the optical fiber provide low-loss, single-mode propagation over a reasonably wide wavelength range around the intended operating wavelength of the communications system, have a spot size which permits easy, low-loss coupling between fibers, and exhibit relatively low bending loss.

Among other generally desirably characteristics of a single mode fiber design are relative insensitivity of the propagation characteristics of the fiber to small variations in one or more fiber parameters, and a relatively small slope of the dispersion vs. wavelength curve of the fiber at and near the zero dispersion wavelength $\lambda_o$ of the fiber. Desirably a fiber design also requires only a relatively small thickness of "low loss" cladding, to achieve a predetermined performance specification (typically bending loss and/or attenuation), since the cost of "low loss" cladding material is typically much higher than that of "high loss" cladding material. A still other desirable characteristic of a fiber design is the ability to achieve desired propagation characteristics with a relatively low doping level in the core, since the scattering loss of an optical fiber generally increases with doping level. In some cases it is desirable that a fiber has a relatively broad spectral region of low chromatic dispersion.

In view of the commercial significance of single mode optical fiber, a relatively simple design feature that results in, or improves, one or more of the above described desirable characteristics of optical fiber is of considerable interest. This application discloses fiber designs that comprise such a feature.

SUMMARY OF THE INVENTION

The invention is a single mode optical fiber with a depressed-index ring or trench region outside of the core of the fiber and within the cladding of the fiber. Herein "core" is used in the conventional manner, to refer to the (relatively high index) central region of the optical fiber which contains, at $\lambda_{op}$, a substantial portion (e.g., typically more than about 50%) of the optical power in the fiber. In general, the invention includes a variety of index profiles for the core region and a variety of index profiles for the cladding region. The trench region is separated from the core region by a first cladding region. The fiber can be made by a variety of processes including the modified chemical vapor deposition process (MCVD) referred to above.

The inventive optical fiber is adapted for single mode operation at least at one operating wavelength $\lambda_{op}$. It comprises a core and a cladding that contactingly surrounds the core. The core has a refractive index profile $n_1(a)$ (a herein is the radial fiber coordinate) and a radius $a_1$. The cladding is typically considered to extend from $a_1$ to at least $a_p$, a radius that is defined by the requirement that at $\lambda_{op}$ only $10^{-12}$ of the intergrated mode power extends into that part of the fiber cross section that has a $>a_p$. The cladding comprises a first cladding region that extends from $a_1$ to a radius $a_2$ and has a refractive index $n_2(a)$, an index trench that extends from $a_2$ to a radius $a_3$ and has a refractive index $n_3(a)$, and a second cladding region that extends outward from $a_3$ and has a refractive index in $n_4(a)$, with $a_1<a_2<a_3<a_p$. The maximum value of $n_3(a)$ is less than the minimum value of $n_2(a)$, and is also less than $n_4(a=a_3)$, the refractive index of the second cladding region at the boundary with the trench. The first cladding region, the trench, and optionally the inner portion of the second cladding region are "low loss" material, and the refractive index of this "low loss" material typically is everywhere less than the maximum value of $n_1(a)$.

The trench parameters (e.g., $a_2$, $a_3$, and $n_3(a)$) are chosen such that one or more fiber characteristics are improved, relative to a second optical fiber that does not have the trench. Among the fiber parameters that can be improved by means of a trench are: the slope of the curve of chromatic dispersion vs. wavelength at the zero dispersion wavelength $\lambda_o$ (it can be reduced); the spectral range over which the absolute value of the chromatic dispersion is less than a predetermined value (it can be increased); the maximum absolute value of the chromatic dispersion in a given spectral range (it can be decreased); the bending loss at a given bend radius (it can be decreased); the ratio $a_d/a_1$ (it can be decreased); the optical quality of the tube-derived material (a lossier, and therefore cheaper, material can be used); the integrated mode power at $a_d$ (it can be decreased); the dopant concentration in the core (it can be decreased, resulting typically in lower scattering); and the dependence of $\lambda_o$ on the core radius (it can be decreased, resulting in improved manufacturability). Under appropriate circumstances, an index trench may also be used to shift $\lambda_o$ to a shorter wavelength.

The notation "n(a)" is intended to convey that the refractive index is a function of the radius (but not excluding a constant index). However, for simplicity's sake, refractive indices are also denoted herein by n, without intending to imply constancy of the refractive index as a function of radius.

Viewed broadly, the invention is a first optical fiber that comprises one or more refractive index trenches. The trench(es) is (are) chosen such that one or more characteristics of the first fiber are improved, without substantial adverse effect on other fiber characteristics. The improvement is relative to the characteristics of a second (reference) optical fiber that closely resembles the first optical fiber (both in terms of structure and transmission properties) but does not comprise the trench (or trenches). Herein a statement that "the first and second optical fibers are identical except for certain stated differences" is intended to indicate that the two fibers are essentially the same in all respects (including composition, index profile, and transmission properties such as optical loss). Typically, the second optical fiber has, inter alia, the same values of $n_1(a)$, $a_1$, $n_2(a)$, $a_2$, $n_4(a)$, and $a_3$ as the inventive (first) fiber, but $n_3(a)=n_2(a=a_2)$ in the second fiber. That is to say, the second fiber refractive index in the region from $a_2$ to $a_3$ is constant and equal to the value of $n_2(a)$ at $a_2$. Somewhat different profiles for the second fiber may be appropriate in some cases, as will be indicated below.

Although the discussion herein is generally in terms of a fiber with a single trench of nominally rectangular cross section, designs that comprise more than one trench are also contemplated. With such designs it may be possible to simultaneously advantageously affect more fiber characteristics than is possible with a single trench. Typically, such further trenches are located in the fiber region outside of $a_3$. Furthermore, a trench need not have a nominally rectangular cross section but can have any other appropriate cross section (e.g., nominally trapezoidal), including a compound cross section as exemplified in FIG. 12.

In all cases the trench(es) is (are) placed such that the presence of the trench(es) has an effect on the optical properties of the fiber. This requires that (at $\lambda_{op}$) a substantial fraction of the total optical power that propagates in the fiber extends beyond the inner radius of the outermost trench. The fraction may be as large as $10^{-2}$ or even larger, or may be as small as $10^{-6}$ or even less. Since the inner radius of the outermost trench is less than $a_p$, it is clear that (at $\lambda_{op}$) the fraction of the total optical power that propagates in the fiber beyond that inner radius is typically substantially greater than $10^{-12}$.

As is well known to those skilled in the art, actual fibers have index profiles that generally differ to some degree from the idealized profiles typically depicted in the literature and also herein. The departures from the idealized profiles are due to unavoidable manufacturing limitations (e.g., the central dip in the core of some fibers is typically due to loss of dopant during preform collapse) or due to the physics of the manufacturing process (e.g., dopant diffusion results in a rounding of sharp features of the index profile). These departures from ideality are well understood and despite their existence, the properties of actual fibers typically closely follow the calculated properties of fibers with "ideal" index profiles.

DETAILED DESCRIPTION

The invention is a single-mode optical fiber with at least one index trench (or depressed-index ring) outside the core region. In broad terms, the invention involves the inclusion in a single-mode fiber design of at least one index trench in the cladding region in such a position that it affects the optical propagation characteristics of the fiber. The principal advantage of such a fiber structure is the ease of adjusting fiber characteristics by adjustment of trench placement, trench width, trench refractive index, etc. It permits design of fibers for useful wavelengths (exemplarily the region around 1.31 and/or 1.55 μm) with excellent fiber characteristics without significant detrimental features.

The optical fiber of the present invention may be described as follows: the fiber is made up of concentric regions of transparent material with different indices of refraction and radial thicknesses. Typically, there are at least four regions which affect the propagation characteristics of the fiber. There is a core region with refractive index $n_1(a)$ and radius $a_1$; a first cladding region with index $n_2(a)$ which extends from radius of $a_1$ out to a radius $a_2$; a trench region with index $n_3(a)$ extending out from $a_2$ to a radius $a_3$; and a second cladding region with index $n_4(a)$ extending from $a_3$ out at least to a previously defined radius $a_p$.

For some purposes, it may be desirable to provide still further propagation—affecting fiber regions, e.g., one or more further trenches within the critical portion (of radius $<a_p$) of the fiber. The principles of the invention can be easily extended to the use of multiple trenches. Therefore, most of the discussion herein will be in terms of a single trench.

The index of refraction within each cladding region need not be constant but may vary as a function of radius. Various preferred embodiments are described which can exhibit low loss and favorable characteristics for a particular wavelength region (e.g., zero dispersion or low dispersion in a wavelength region of interest) and are relatively easy to fabricate. In many cases the trench region is separated from the core by a region with relatively flat (nominally constant) index of refraction.

The structure of the fiber may be defined in terms of the index of various regions. First, the maximum index of the core region is larger than any of the other indices of at least the deposited portion of the cladding. Second, the maximum index of the trench region is less than the minimum index of the first cladding region and the index of the second cladding region at $a_3$.

A significant feature of the inventive fiber structure is the existence and nature of the first cladding region separating core region from the trench region. The thickness of this region may vary from a minimum determined by feasibility in fabrication of the fiber (about one micron) to a maximum consistent with the requirement that the trench structure affects the propagation characteristics of the fiber. The indices of the various fiber regions may vary, provided said indices adhere to the restrictions set forth above and below. Indeed, index of refraction variation within the core region is often used to adjust or optimize various optical characteristics of the fiber. Often, the maximum index occurs at or near the center of the fiber and the index decreases continuously to the edge of the core.

The regions defined above apply to the part of the fiber affecting propagation characteristics of the fiber and does not preclude use of various coverings (glass, plastic or other material) used to protect the fiber but not substantially affecting the propagation characteristics of the fiber. Generally, at a fiber radius where the power outside the radius is less than $10^{-12}$ of the power inside the radius, fiber material will not significantly affect the optical propagation characteristics of the fiber made in accordance with the invention.

Figure 1:
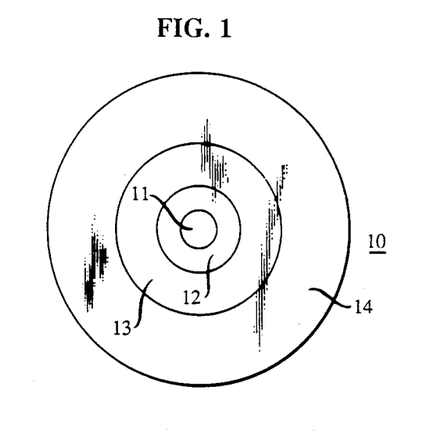
FIG. 1 shows a cross-section of an optical fiber made in accordance with the invention.

FIG. 1 shows a cross-section of an optical fiber 10 made in accordance with the invention. The optical fiber is made up of various regions of transparent material generally distributed with axial symmetry around the center axis of the fiber. The different regions are defined by their index of refraction which need not be constant within each region. The optical fiber is made up of a core region 11 with index $n_1$ shown in the center surrounded by a first cladding region 12 with index of refraction $n_2$. The first cladding region 12 is surrounded by a trench region 13 with index $n_3$ and in turn the trench region is surrounded by a second cladding region 14 with index $n_4$. Other coatings, including glass coatings, may surround the outer cladding region 14 for protective purposes, strength, ease of handling, etc., but do not affect the propagation properties of the optical fiber. In many applications, $n_2$, $n_3$ and $n_4$ are substantially constant.

The index profile of a fiber often is conveniently described in terms of the relative index of refraction of the transparent material making up the fiber. For small differences in the index of refraction, the relative index of refraction associated with the i'th fiber region is given by the equation $$\Delta_i = \frac{n_i^2 - n_o^2}{2n_o^2} \qquad (1)$$

Here, $n_o$ is a reference index of refraction (in current practice usually the refractive index of undoped vitreous silica) and $n_i$ is the (sometimes) variable index of the transparent material making up the i'th region of the fiber.

Figure 2:
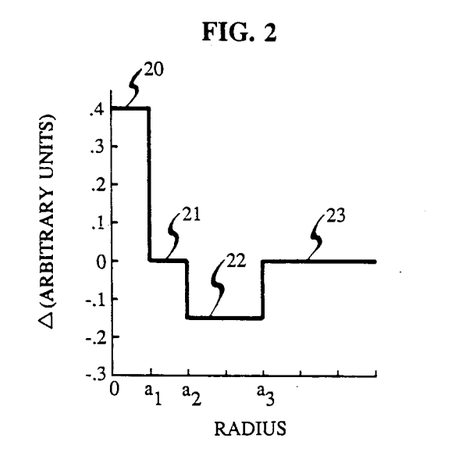
FIGS. 2-4 show the variation in index of refraction with radial distance for exemplary inventive fibers.

It is instructive and convenient in understanding the invention to describe a few simple embodiments of the invention. FIG. 2 shows a graph of relative index of refraction vs. radius of an exemplary fiber made in accordance with the invention. The index profile comprises (step index) core 20, first and second cladding regions 21 and 23, respectively, and trench 22. In this profile, as well as in all other profiles depicted herein, no attempt is made to represent indices and radii to scale and/or in exact relative magnitude. Exemplarily, the second cladding region is made of undoped silica glass, although other glass compositions may be used. For the example given in FIG. 2 (where first and second cladding region have approximately the same index), the first cladding region is also conveniently made of silica glass, although other glass compositions may be used. Germania is often used to increase the index of refraction of silica (e.g., in the core region) and fluorine is often used to decrease the index (e.g., in the trench region).

Figure 3:
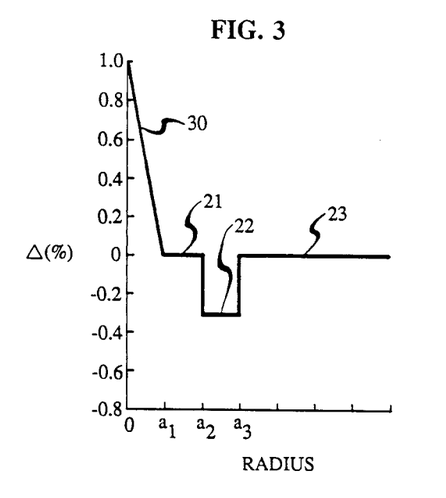

FIG. 3 shows another exemplary embodiment of the invention. The figure shows a graph of relative index of refraction vs. radius for a fiber where the index of refraction in the core region 30 varies with the radius. In FIG. 3, the index of refraction of the core decreases linearly with radial distance from the center of the fiber. This index variation is usually referred to as a triangular profile. Other index variations are useful such as a parabolic, trapezoidal profile, etc.

Figure 4:
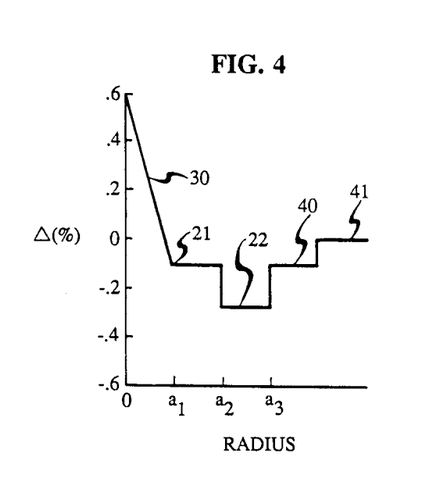

FIG. 4 schematically depicts a further exemplary embodiment of the invention, a so-called depressed cladding design with triangular core profile. Both the first cladding region 21 and the inner portion 40 of the second cladding region are doped such as to have a refractive index that is lower than that of the outer portion 41 of the second cladding region (which is frequently "high loss" undoped silica). As shown, the core 30 is up-doped, the first cladding region and the inner second cladding regions are relatively lightly down-doped, and the trench region is more heavily down-doped. Typically, regions 30, 21, 22, and 40 consist of deposited silica-based material. Techniques for producing this and other fiber profiles discussed herein are well known to those skilled in the art.

Figure 5:
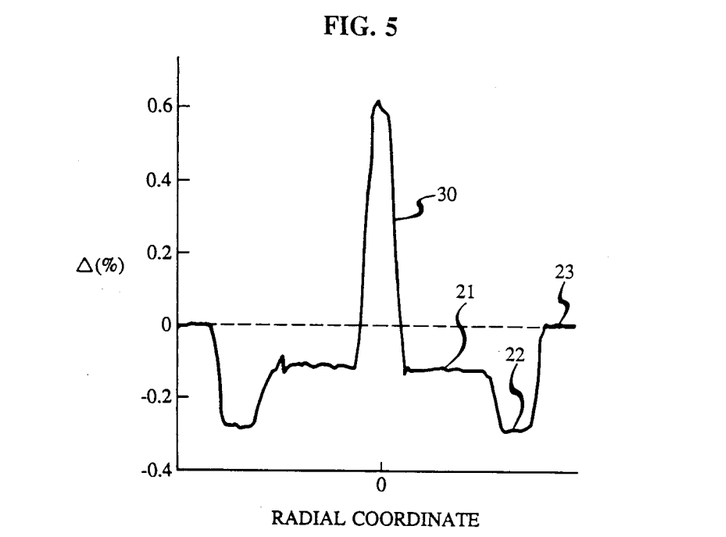
FIG. 5 shows the measured index profile of an exemplary fiber according to the invention.

It should be realized that most of the index profiles set forth in this disclosure are somewhat idealized, since in actual fibers sharp trasitions in index are typically smoothed out due to the fabrication techniques used. FIG. 5 depicts the experimentally determined profile of an exemplary inventive fiber with (nominally) triangular core 30, depressed index first cladding region 21, trench 22, and matched index second cladding region 23.

Further preferences in the index structure of the fiber are concerned with the size (radius) of the various regions. First, the various regions typically have circular cross-sections, with $a_1 < a_2 < a_3 < a_p$. In addition, the radius of the core region $a_1$ is typically between 1.5 and 10 μm, the radial thickness of the first cladding region $(a_2 - a_1)$ is from 1/10 to 20 times the radius of the core region, and the radial thickness of the trench region $(a_3 - a_2)$ is from one micron to about five times the radius of the core region. The minimum radius or radial thickness of the core, first cladding and trench regions, respectively, are generally limited by convenience in fabricating the fiber. Wider trench regions than the maximum given above may be used but the increased width usually does not have a marked affect on the propagation characteritics of the fiber. Similarly, the maximum radial width of the first cladding region is limited by the fact that the trench region should be close enough to the core to affect the propagation characteristics of the fiber.

As stated above, the second cladding region is typically only defined out to the radius where the integrated power outside this radius is less than $10^{-12}$ of the overall power. Considering this definition, the radial thickness $a_p - a_3$ of the second cladding region is typically between 1.0 and 35 μm. The overall diameter of the fiber is generally between 60 and 200 μm, with 125 μm currently preferred. Furthermore, typically $a_d \leq a_p$.

Further preferences in fiber dimensions are as follows: the core radius ($a_1$) is between $2\frac{1}{2}$ and 5 μm, the radial thickness $(a_2 - a_1)$ of the first cladding region is between $\frac{1}{2}$ and 10 times the core radius ($a_1$), and the radial thickness of the trench region is between one and five times the core radius.

Optimum designs of optical fiber index profiles can be deduced with the aid of computer-aided modeling studies as those outlined by T. A. Lenahan in an article entitled "Calculation of Modes in an Optical Fiber Using the Finite Element Method and EISPACK" published in The Bell System Technical Journal, Vol. 62, No. 9, pp. 2663–2694 (November 1983). As is well known to those skilled in the art, such studies can be used to calculate substantially all significant fiber parameters, e.g., zero dispersion wavelength, tolerance curves for the zero dispersion wavelength ($\lambda_o$), mode effective-index values ($\Delta_{eff}$), cut-off characteristics, mode power profiles, and minimum cladding thickness requirements.

The optimization procedure will be illustrated with respect to a triangular core lightguide structure such as shown in FIGS. 3 and 4. This type of fiber profile is useful for achieving low losses with dispersion shifting, and has other known advantages.

A number of competing design requirements enter into the optimum design of a fiber. For example, it is desirable to minimize the dependence of $\lambda_o$ on core radius. Also, it is desirable to keep $\Delta_{eff}$ of the guided mode large to insure low bending losses.

Figure 6:
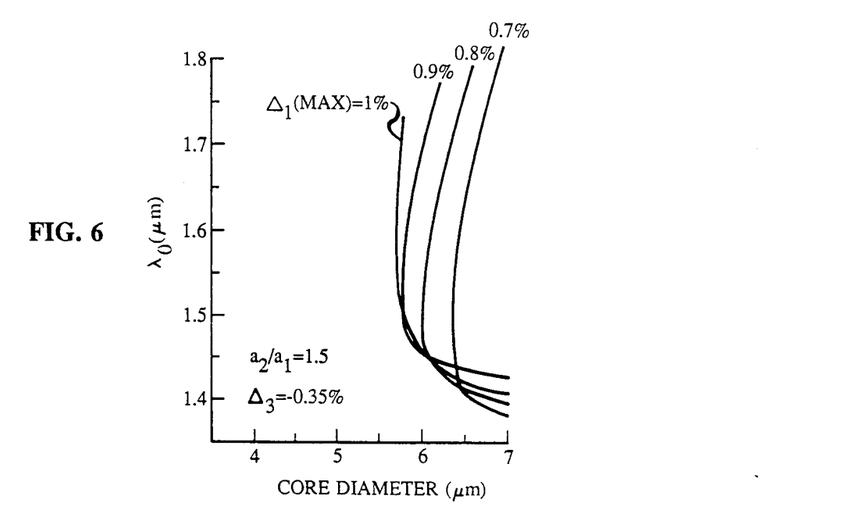
FIGS. 6 and 7 show, for an optical fiber structure as shown in FIG. 3, the wavelength of zero dispersion vs. core diameter for various maximum core indices.

For a fiber design of the type shown in FIG. 3, curves were generated for $\lambda_o$ vs. core diameter ($d = 2a_1$). These curves are shown in FIG. 6 for $\Delta_3 = -0.35\%$, $a_2$-

Figure 7:
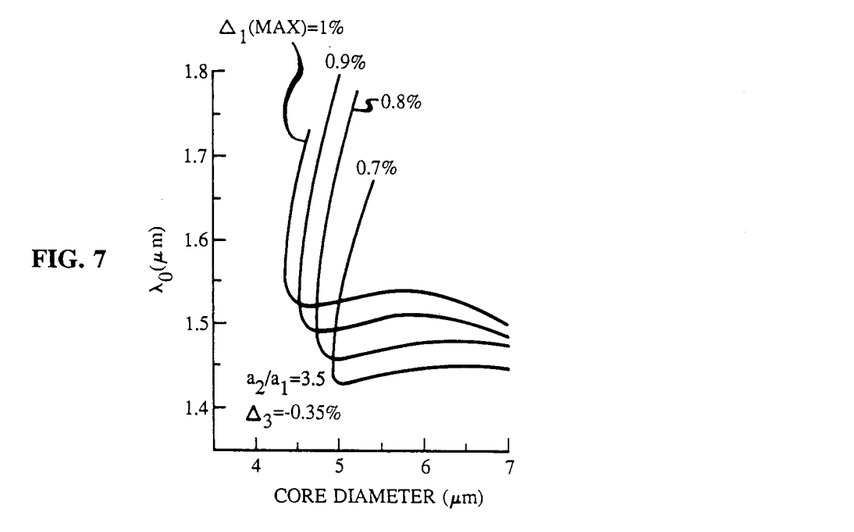
Figure 8:
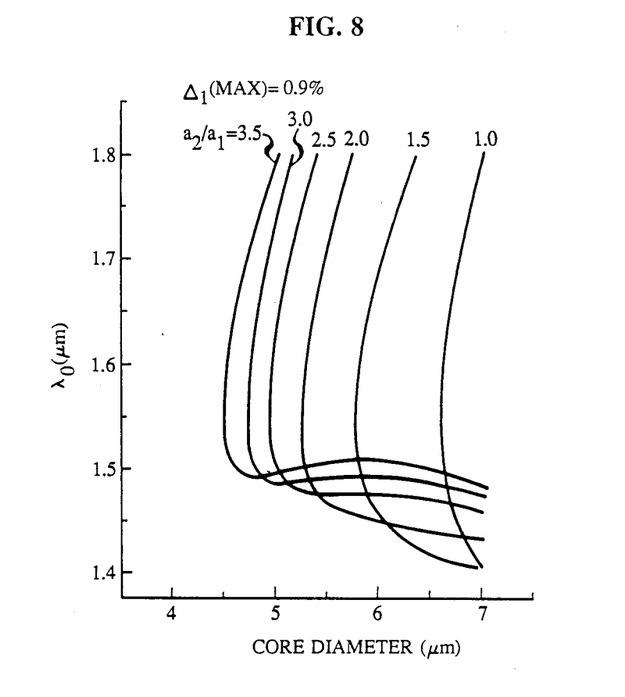
FIG. 8 shows, for an optical fiber structure as shown in FIG. 3, the wavelength of zero dispersion vs. core diameter for various trench spacings from the core.

/$a_1=1.5$, $(a_3-a_2)=a_1$ and various values of $\Delta_1(MAX)$ between 0.7 and 1.0%. FIG. 7 shows the same type of curves for the same trench located 3.5 core radii from the core ($a_2/a_1=3.5$). FIG. 8 shows the dependence of $\lambda_o$ on core diameter, for the same trench, $a_2/a_1$ between 1 and 3.5, and $\Delta_1(MAX)=0.9\%$. For the ranges of parameters used, FIG. 6 shows that for $\lambda_o>1.4$ $\mu$m the value of $\lambda_o$ depends relatively strongly on the core diameter. FIG. 7 shows that, for the indicated parameters, there exists a regime of $\lambda_o$ and core diameters in which $\lambda_o$ depends relatively weakly on core diameter. Such weak dependence implies good manufacturability, since a small variation in core diameter results in substantially no change in $\lambda_o$. The improved manufacturability is due to the presence of the trench at an intermediate spacing from the core. This is also demonstrated by FIG. 8, which shows that the dependence of $\lambda_o$ on core diameter increases as $a_2/a_1$ decreases.

Figure 9:
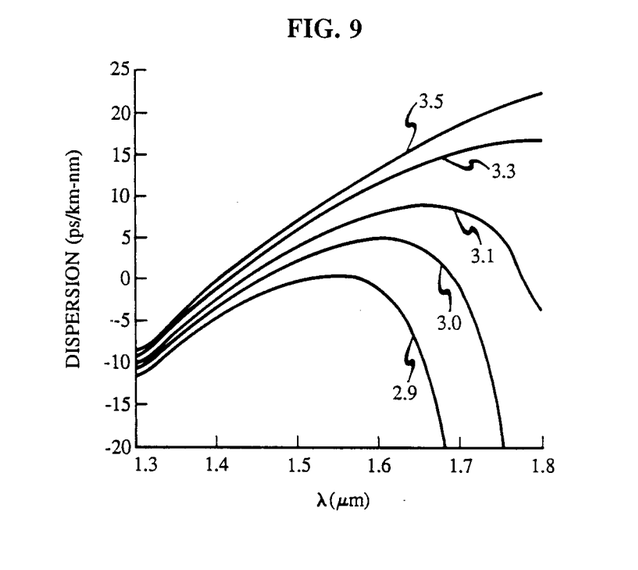
FIGS. 9 and 10 show the dispersion vs. wavelength for several core radii for a fiber structure such as is shown in FIG. 3, with and without trench, respectively.
Figure 10:
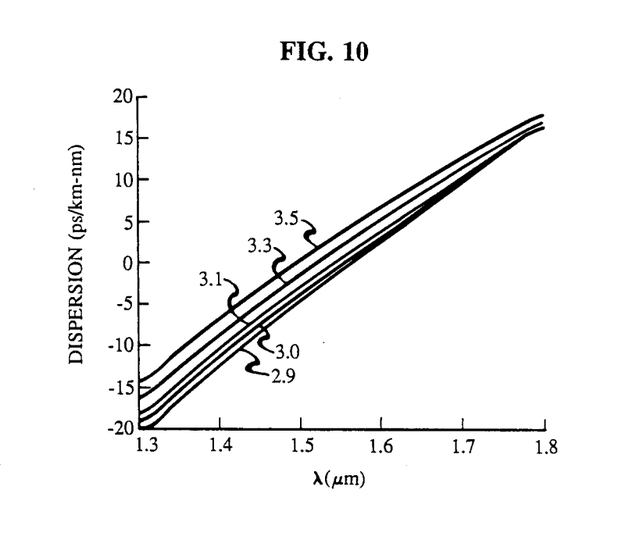

FIG. 9 shows dispersion spectra vs. wavelength for fibers of the type shown in FIG. 3, with $\Delta_1(MAX)=0.9\%$, $\Delta_3=-0.35\%$, $a_2/a_1=1.5$, $(a_3-a_2)=a_1$, and different core radii. As the core radius is reduced, power extends further into the cladding, and the trench influences dispersion at shorter wavelengths. The effect is to displace dispersion spectra downward and move the two zero dispersion wavelengths closer together until the chromatic-dispersion curve becomes tangent to the zero dispersion axis. For even smaller diameters the chromatic-dispersion curves move completely below the zero axis. For comparison, FIG. 10 shows the dispersion spectra for a second fiber that has the same index profile as the fiber of FIG. 9, except that the second fiber lacks the trench. These curves show the usefulness of the trench in improving the propagation characteristics of optical fibers. In particular, they demonstrate that, in this particular case, the addition of the trench resulted in a substantial broadening of the wavelength region of low chromatic dispersion (e.g., <2ps/km.nm). The trench fiber also exhibits a lower dispersion slope at the lower zero dispersion wavelength than the reference fiber of FIG. 10, for at least some of the core diameters shown.

For the index profile of the type shown in FIG. 3, the procedure described above shows a preferred index profile as follows: $a_1$ between 2.5 and 3.5 $\mu$m, $a_2/a_1$ between 1.5 and 3.5, $a_3-a_2$ between 16 and 18 $\mu$m and the second cladding region extending from $a_3$ to $a_p$ and typically comprising an inner "low loss" cladding region and frequently an outer "high loss" region. The preferred indices are as follows: $\Delta_1(MAX)$ from 0.5 to 1.5% with from 0.8 to 1.0% most preferred, $\Delta_2$ and $\Delta_4$ approximately equal to zero and $\Delta_3$ between $-0.1$ and $-0.6\%$.

The profile geometries that have been discussed are examples of matched cladding structures because the refractive index of the outer "low loss" cladding is the same as the index of the "high loss" cladding (typically $SiO_2$). However, often intrinsic fiber losses are limited by scattering effects which depend on the core dopant concentration (typically germania). Therefore, lower intrinsic losses can be achieved by lowering the core dopant concentration and using fluorine as a dopant to depress the cladding indices below silica in order to maintain the same relative index profile. This material modification will have only a minor effect on the previously derived lightguide parameters. Fluorosilicate substrate tubes or fluorine-doped deposited outer cladding may also be useful in this context.

A typical depressed cladding index profile is shown in FIG. 4. Preferred dimensions and indices are as follows: $a_1$ from 2.5 to 3.5 $\mu$m, $a_2/a_1$ from 1.5 to 3.5, $a_3-a_2$ from 6–18 $\mu$m and $(a_p-a_3)$ from 1.0 to 35 $\mu$m.

Exemplary index values are $\Delta_1(MAX)$ from 0.2 to 1.2%, with 0.7 to 0.9% most preferred, $\Delta_2$ approximately equal to $\Delta_4$ and between $-0.1$ and $-0.6\%$ (for $a<a_d$), and $\Delta_3$ between $-0.5$ and $-1.2\%$.

Figure 12:
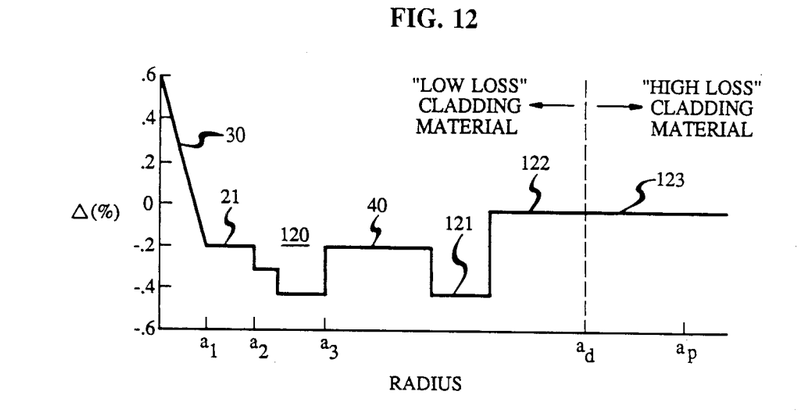
FIG. 12 schematically depicts a further exemplary refractive index profile of fiber according to the invention.

A further exemplary index profile of fiber according to the invention is schematically depicted in FIG. 12. The fiber has a triangular core 30, a depressed index first cladding region 21, and an inner trench 120 of compound cross section. The fiber also comprises a multi-region second cladding region that comprises depressed cladding 40, an outer trench 121, a matched index "low loss" cladding region 122, and a "high loss" cladding region 123 that extends beyond the outer radius $a_p$ of the cladding to the physical outer surface of the fiber (not shown).

In another exemplary embodiment the first cladding region refractive index (e.g., 21 of FIGS. 2, 3, 4, or 12) is substantially larger than the refractive index of at least the inner portion of the second cladding region (e.g., 23 of FIGS. 2 or 3; 40 of FIGS. 4 or 12).

Figure 13:
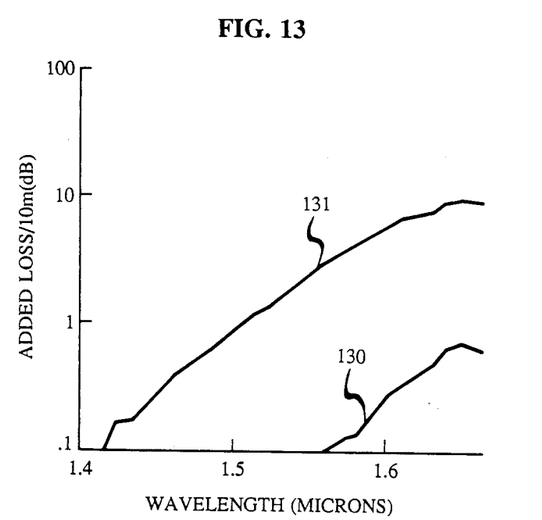
FIG. 13 gives data on the bending loss of a prior art fiber and of a fiber according to the invention.

FIG. 13 illustrates another advantageous feature of the invention, namely, the ability to obtain improved bending behavior. Curve 130 is the added loss (due to one 10.5 mm diameter loop) of an inventive fiber (with profile substantially as shown in FIG. 5), and curve 131 is the added loss of a prior art fiber that is essentially identical to the former but lacks trench 22 (i.e., the first cladding region 21 is extended out to the second cladding region 23). As is evident from FIG. 13, the inventive fiber has substantially lower added loss than the prior art fiber.

FIGS. 14–18 illustrate a further advantage of the invention, namely, the ability to attain improved power confinement. This in turn allows reduction of the thickness of the "low loss" cladding, frequently referred to as $D/d$ (where $D=2a_d$ and $d=2a_1$). Alternatively, improved power confinement may permit the use of a lossier (and thus generally cheaper) "high loss" cladding, and/or may result in a lower loss fiber, as will be apparent to those skilled in the art. Improved power confinement may also permit a reduction of the overall fiber diameter below currently prevailing values.

Figure 14:
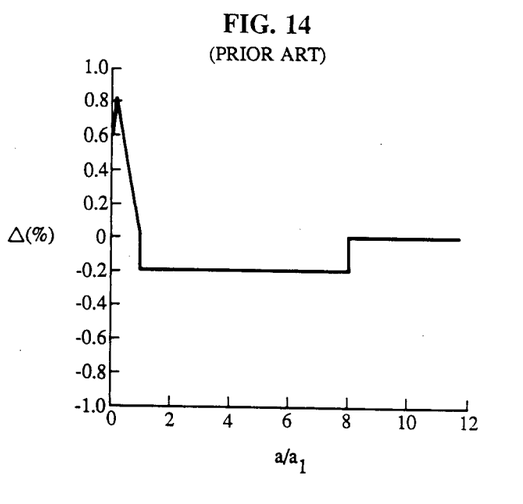
FIG. 14 shows a prior art refractive index profile.
Figure 15:
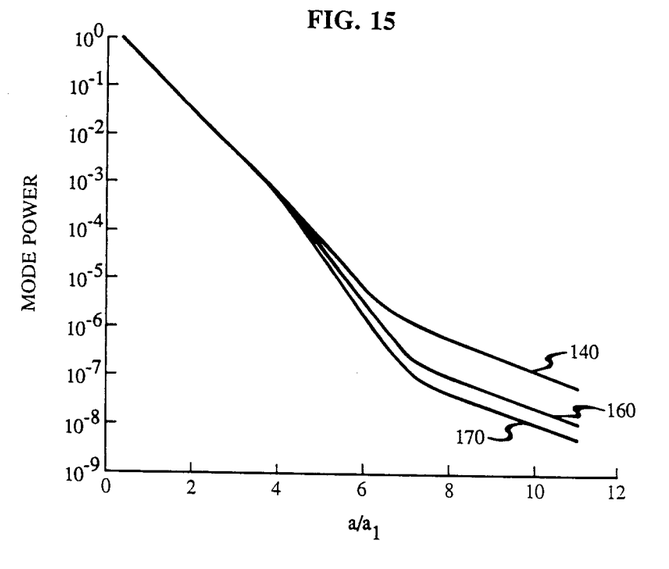
FIG. 15 shows the integrated mode power as a function of $a/a_1$ for the fibers of FIGS. 14, 16 and 17.
Figure 16:
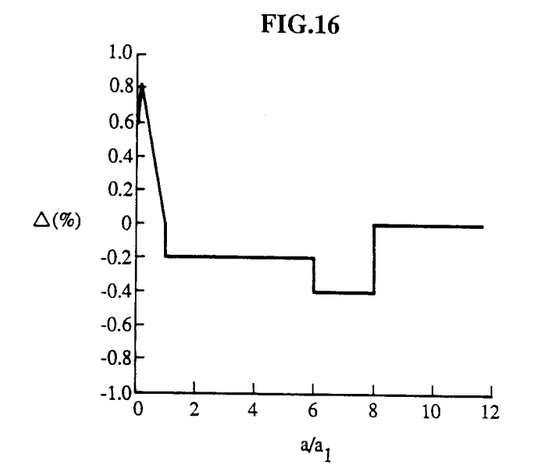
FIGS. 16 and 17 schematically depict two inventive refractive index profiles.
Figure 17:
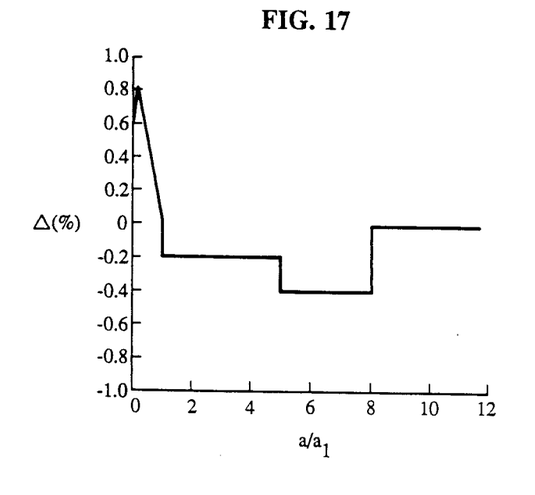

FIG. 14 shows an exemplary prior art index profile having $a_d/a_1=8$ and FIG. 15 shows, inter alia, the integrated mode power distribution 140 for the fiber of FIG. 14. FIGS. 16 and 17 show inventive fibers also having $a_d/a_1=8$ but comprising trenches ($a_2=6a_1$ and $5a_1$, respectively; $a_3=8a_1$) having $\Delta_3=-0.4\%$. FIG. 15 also shows the integrated mode power distributions 160 and 170 for the fibers of FIGS. 16 and 17, respectively. As can be seen from FIG. 15, the presence of the trenches results in improved power confinement, with the wider trench being even more effective than the narrower trench. The mode power confinement obtained in the exemplary inventive fibers is comparable to that obtained in a prior art fiber having $D/d$ of about 10 but otherwise identical to the fiber of FIG. 14. Thus, the presence of a trench can make possible reduction of the thickness of the deposited cladding, may permit use of lossier "high loss" material (without increase in fiber loss), can result in lower fiber loss (with the same $D/d$), or may permit reduction of the overall fiber diameter.

Figure 18:
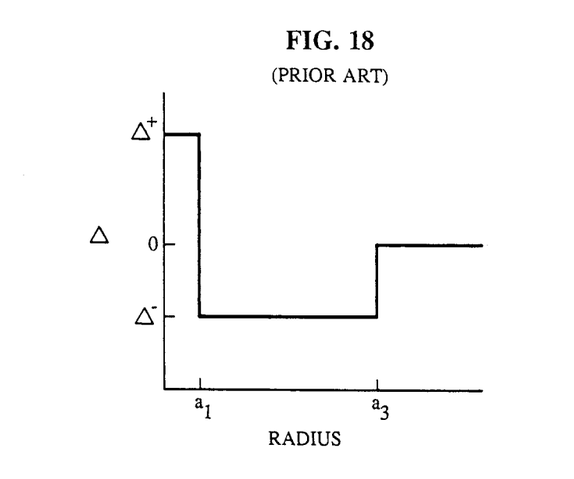
FIG. 18 shows a further prior art fiber profile.
Figure 19:
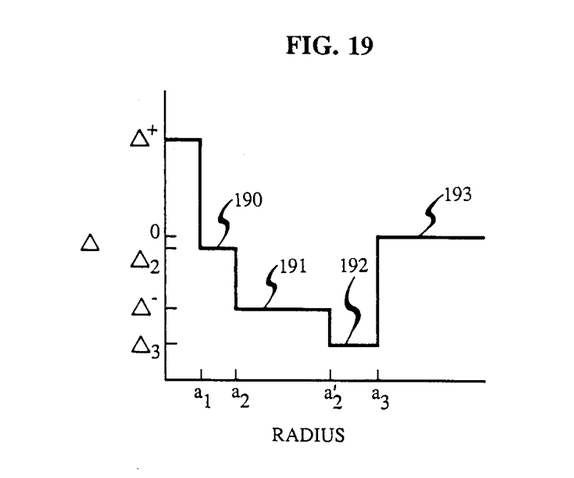
FIG. 19 depicts schematically an inventive fiber profile.

FIG. 18 schematically shows a prior art depressed cladding profile, and FIG. 19 a closely related inventive profile that has a first cladding region 190, a compound trench (191 and 192) and a second cladding region 193. If both fibers have the same value of $a_1$(4.15 μm) and $a_3$(18.7 μm), as well as $\Delta^-$(−0.09%), then both fibers can have substantially the same guiding properties ($\lambda_o$=1.311, $n_{eff}(\lambda=1.6$ μm)=0.00091, mode field radius $\omega$=4.44 μm (prior art) and 4.69 μm (inventive), power fraction beyond $a_3$=7.6×10$^{-5}$ (prior art) and 4.5×10$^{-5}$ (inventive), if $a_2$=1.92$a_1$, $a_{\frac{1}{2}}$=12.45 μm, $\Delta_2$=−0.03%, and $\Delta_3$=−0.16%. However, $\Delta^+$ in the prior art fiber is 0.27%, whereas it is only 0.25% in the inventive fiber. Incorporation of the exemplary compound trench into the fiber profile thus makes possible lower core doping (which in turn can be expected to result in lower Raleigh scattering), while at the same time substantially maintaining the guiding properties of the fiber.

Figure 20:
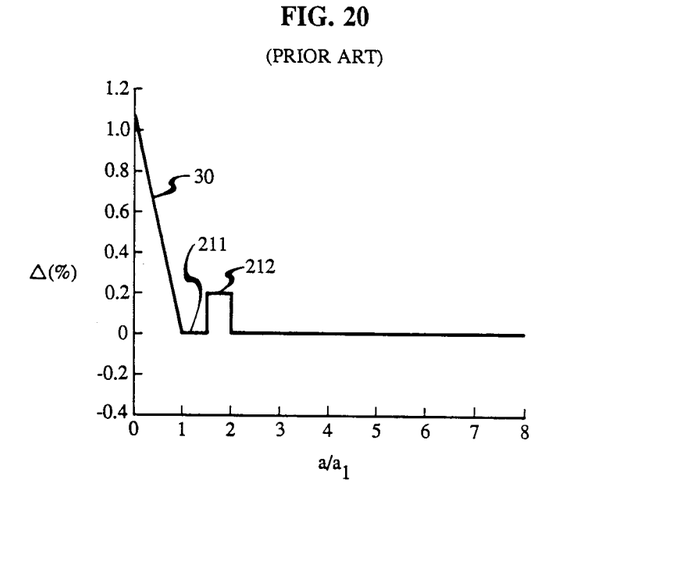
FIG. 20 shows a still further prior art fiber profile.
Figure 21:
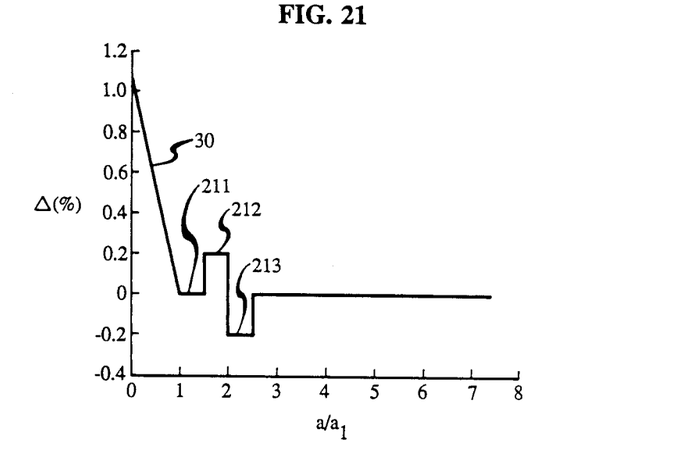
FIG. 21 shows schematically a further inventive fiber profile.
Figure 22:
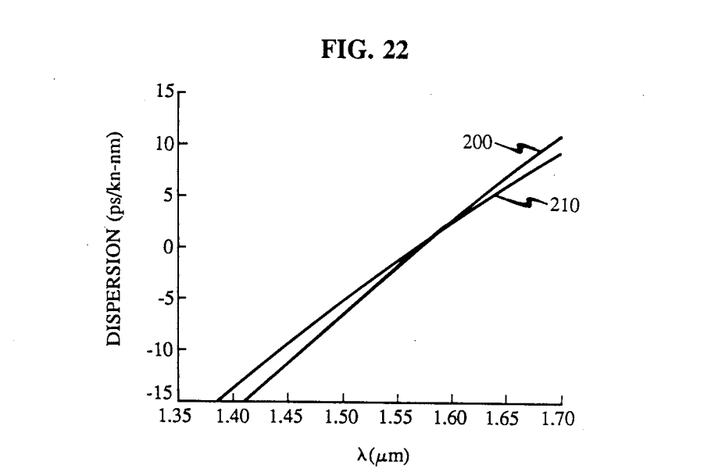
FIG. 22 shows the dispersion curves for the fibers of FIGS. 20 and 21.

FIG. 20 shows a prior art fiber of the type disclosed in the previously referred to European patent application No. 82306476.1 comprising core 30 and a compound first cladding region (211, 212), and FIG. 21 schematically depicts a corresponding inventive fiber that comprises trench 213 ($n_3$=−0.2%, $a_3$=2.5 $a_1$). Both fibers have substantially the same mode power distribution for radii greater than about 6$a_1$. However, as shown by FIG. 22, the inventive fiber has substantially lower (by about 17%) dispersion slope (curve 210) than the prior art fiber (curve 200), without a significant shift in $\lambda_o$. A low dispersion slope is of obvious advantage.

Although the fiber of FIG. 21 has essentially the same $\lambda_o$ as the fiber of FIG. 20, in some cases it may be desirable to shift $\lambda_o$ (including a shift to a shorter wavelength), and a trench can be used to accomplish such a shift.

It can be said in general that a trench relatively far from the core may improve mode confinement, inmprove bending loss, permit the use of lossier "high loss" cladding material or permit reduction in the overall fiber diameter, a trench relatively close to the core may result in a flatened dispersion curve and/or an increased region of low dispersion, or move $\lambda_o$ to a shorter wavelength, and a trench at intermediate distance from the core may result in a decreased slope of the dispersion curve, without substantial effect on $\lambda_o$, or may reduce the dependence of $\lambda_o$ on core radius and therefore improve manufacturability.

Figure 11:
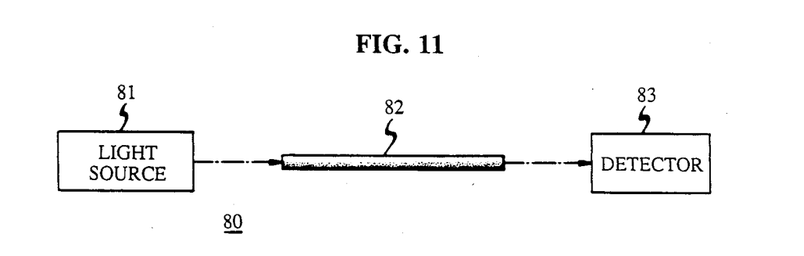
FIG. 11 shows an optical communication system including optical fiber.

The fibers described above can be incorporated into an optical communication system in a manner well known to those skilled in this art. An exemplary communication system is schematically shown in FIG. 11. The optical communication system 80 is made up of an optical source 81, which emits radiation at the operating wavelength (typically in the near infrared region, e.g., 1.3-1.55 μm), an optical fiber 82 and a detector 83. The light source is typically a laser or light emitting diode. Generally a pulse-type signal (pulse code modulation) is emitted from the light source, transmitted through the optical fiber and detected at the receiver.

What is claimed is:

1. An optical fiber, adapted for single mode operation at an operating wavelength $\lambda_{op}$, that comprises
   (a) a core having a refractive index $n_1(a)$, and a radius $a_1$, where a is the radial fiber coordinate;
   (b) a cladding that contactingly surrounds the core and extends outward from $a_1$, at least the part of the cladding between $a_1$ and a radius $a_d$ consists of relatively low optical loss first cladding material having a refractive index that nowhere exceeds the maximum value of $n_1(a)$; associated with the fiber are fiber characteristics comprising:
   (i) a curve of chromatic dispersion vs wavelength, the curve having a slope and a zero at least at one zero dispersion wavelength $\lambda_o$;
   (ii) a dependence of $\lambda_o$ on $a_1$;
   (iii) a spectral range in which the absolute value of the curve of chromatic dispersion vs. wavelength is less than a predetermined value;
   (iv) a curve of integrated mode power vs. radius;
   (v) a bending loss at a given bend radius; and
   (vi) a maximum core doping level and, associated therewith, a Rayleigh scattering loss;
   (c) the cladding comprises a first cladding region that extends from $a_1$ to radius $a_2$ and has a refractive index $n_2(a)$, an index trench that extends from $a_2$ to a radius $a_3$ and has a refractive index $n_3(a)$, and a second cladding region that extends outward from $a_3$ and has a refractive index $n_4(a)$, with $a_1 < a_2 < a_3 \leq a_d$, and with the maximum value of $n_3(a)$ being less than the minimum value of $n_2(a)$ and also less than $n_4(a=a_3)$, the refractive index of the second cladding at $a_3$.

2. The fiber of claim 1 constituting a first fiber, wherein $a_2$, $a_3$, and $n_3(a)$ are chosen such that the slope of the curve of chromatic dispersion vs. wavelength at $\lambda_o$ is substantially reduced, relative to a second fiber that is identical to the first fiber except that in the second fiber $n_3(a)=n_2(a=a_2)$.

3. The fiber of claim 1 constituting a first fiber, wherein $a_2$, $a_3$, and $n_3(a)$ are chosen such that the integrated mode power at any radius $a \geq a_3$ is substantially reduced, relative to a second fiber that is identical to the first fiber except that in the second fiber $n_3(a)=n_2(a=a_2)$.

4. The fiber of claim 1 constituting a first fiber, wherein $a_2$, $a_3$, and $n_3(a)$ are chosen such that the integrated mode power at any radius $a \geq a_3$ is substantially reduced and such that $a_d$ is substantially reduced, substantially without increase in the bending loss, all relative to a second fiber that is identical to the first fiber except that the second fiber, in addition to having greater $a_d$, has $n_3(a)=n_2(a=a_2)$.

5. The fiber of claim 1 constituting a first fiber, wherein $a_2$, $a_3$, and $n_3(a)$ are chosen such that the integrated mode power at any radius $a \geq a_3$ is substantially reduced and such that the bending loss at a given bend radius is substantially reduced, all relative to a second fiber that is identical to the first fiber except that the second fiber, in addition to having greater bending loss, has $n_3(a)=n_2(a=a_2)$.

6. The fiber of claim 1 constituting a first fiber, wherein $a_2$, $a_3$, and $n_3(a)$ are chosen such that the integrated mode power at any radius $a \geq a_3$ is substantially reduced, relative to a second fiber, the first fiber comprising a relatively high optical loss second cladding material extending outward from $a_d$, associated with the second cladding material being a loss at $\lambda_{op}$, the material of the first fiber second cladding region having substantially higher loss at $\lambda_{op}$ than the corresponding material of the second cladding region of the second fiber, the second fiber being identical to the first except that the second fiber, in addition to having lower loss second cladding material, has $n_3(a)=n_{2a}(a=a_2)$.

7. The optical fiber of claim 1 constituting a first fiber, wherein the maximum core doping level is substantially reduced, relative to a second optical fiber that is identical to the first fiber except that the second fiber, in addition to having a greater core doping level and therefore greater Rayleigh scattering loss, has $n_2(a)=n_3(a=a_2)$, with $n_3(a)$ being constant for $a_2<a<a_3$.

8. The fiber of claim 1, wherein $n_3(a)$ is substantially constant.

9. The first fiber of claim 4, wherein $a_d$ is substantially equal to $a_3$.

10. The first fiber of claim 5, wherein $a_d$ is substantially equal to $a_3$.

11. The first fiber of claim 2, wherein $a_d$ is substantially greater than $a_3$.

12. The first fiber of claim 7, wherein $a_1$ and $a_2$ are chosen such that $(a_2-a_1)$ is from 0.1 to 20 times $a_1$.

13. The fiber of claim 1 constituting a first fiber, wherein $a_2$, $a_3$, and $n_3(a)$ are chosen such that the dependence of $\lambda_o$ on $a_1$ is substantially reduced, relative to a second fiber that is identical to the first fiber except that in the second fiber $n_3(a)=n_2(a=a_2)$.

14. The fiber of claim 1 constituting a first fiber, wherein $a_2$, $a_3$, and $n_3(a)$ are chosen such that the extent of the spectral region in which the absolute value of the curve of chromatic dispersion vs. wavelength is less than a predetermined value is substantially increased, relative to a second fiber that is identical to the first fiber except that in the second fiber $n_39a)=n_2(a=a_2)$.

15. The fiber of claim 1 constituting a first fiber, wherein $a_2$, $a_3$, and $n_3(a)$ are chosen such that the maximum absolute value of the chromatic dispersion in a spectral region of predetermined extent is substantially reduced, relative to a second fiber that is identical to the first fiber except that in the second fiber $n_3(a)=n_2(a=a_2)$.

16. The fiber of claim 1 constituting a first fiber, wherein $a_2$, $a_3$, and $n_3(a)$ are chosen such that $\lambda_o$ is moved to a shorter wavelength, relative to a second fiber that is identical to the first fiber except that in the second fiber $n_3(a)=n_2(a=a_2)$.

17. An optical communication system comprising a light source and a detector, further comprising single-mode optical fiber comprising:

(a) a core of transparent material having a refractive index $n_1(a)$ (where a is the radial fiber coordinate) and a radius $a_1$;

(b) a first cladding region of transparent material, contactingly surrounding said core region, with index of refraction $n_2(a)$ and extending to a radius $a_2$;

(c) a trench region of transparent material, contactingly surrounding the first cladding region, with index $n_3(a)$ and extending to a radius $a_3$; and (d) a second cladding region with index $n_4(a)$ contactingly surrounding the trench region, wherein;

(e) the maximum value of $n_1(a)$ is larger than any of $n_2(a)$ and $n_3(a)$, and is greater than or equal to $n_4(a)$; and (f) the maximum value of $n_3(a)$ is less than the minimum values of $n_2(a)$ and $n_4(a)$, respectively.

18. The optical communication system of claim 17 in which the radius of the core $a_1$ is between 2.5 and 5 $\mu$m.

19. The optical communication system of claim 18 in which $(a_2-a_1)$ is between $\frac{1}{2}$ and 10 times the core radius $a_1$.

20. The optical communication system of claim 19 in which $(a_3-a_2)$ is between one and five times the core radius $a_1$.

21. The optical communication system of claim 17 in which the core index profile is nominally triangular, with $a_1$ between 2.5 and 3.5 $\mu$m and the maximum value of $\Delta_1$ is between 0.5 and 1.5%, where $\Delta_1=(n^2_1-n^2_o)/2n^2_o$, with $n_o$ *being the refractive index of silica*.

22. The optical communication system of claim 21 in which $a_2/a_1$ is between 1.5 and 3.5.

23. The optical communication system of claim 21 in which $(a_3-a_2)$ is between 6 and 18 $\mu$m and $\Delta_3$ is between $-0.1$ and $-0.6\%$, where $\Delta_3$ is $(n^2_3-n^2_o)/2n^2_o$.

24. The optical communication system of claim 17 in which the core index profile is nominally triangular and the refractive index of the first cladding region and of at least a part of the second cladding region is less than the refractive index of silica.

25. The optical communication system of claim 17 where there are additional trench regions within the second cladding region.

* * * * *